May 15, 1956 G. J. NOWOTNY 2,745,894

PRIMARY DRY CELL

Filed June 19, 1952 5 Sheets-Sheet 1

Inventor

Glenn J. Nowotny

By Beale and Jones

Attorneys

Inventor
Glenn J. Nowotny
By Beale and Jones.
Attorneys

May 15, 1956 G. J. NOWOTNY 2,745,894

PRIMARY DRY CELL

Filed June 19, 1952 5 Sheets-Sheet 3

Inventor

Glenn J. Nowotny

By Beale and Jones

Attorneys

May 15, 1956

G. J. NOWOTNY

PRIMARY DRY CELL 2,745,894

Filed June 19, 1952

5 Sheets-Sheet 4

Inventor

Glenn J. Nowotny

By Beale and Jones.

Attorneys

May 15, 1956 G. J. NOWOTNY 2,745,894

PRIMARY DRY CELL

Filed June 19, 1952 5 Sheets-Sheet 5

Inventor
Glenn J. Nowotny
By Beale and Jones
Attorneys

United States Patent Office 2,745,894

Patented May 15, 1956

2,745,894

PRIMARY DRY CELL

Glenn J. Nowotny, Madison, Wis., assignor to Ray-O-Vac Company, Madison, Wis., a corporation of Wisconsin Application June 19, 1952, Serial No. 294,366

25 Claims. (Cl. 136—111)

This invention relates to an improved dry cell and to improved primary batteries made therefrom. More particularly, this invention relates to dry cells of the flat type in which the elements of the cells are in the form of flat sheets or plates and the individual cells are in the form of flat wafers. With further particularity this invention relates to a unit dry cell in which each unit is a complete cell in itself and in which the cell components are sealed within a pair of plastic sheets which are bonded together around the entire periphery of each sheet.

There are several types of flat dry cells and flat dry cell batteries made therefrom. In most types each cell is a discrete unit wherein it is conventional to use at least one of the electrodes as a cell terminal, or to place the cell components within a metal cup which serves as a cell terminal. In most of these types of dry cells the positive electrode must be impervious to the electrolyte, or must be adjacent to a conducting terminal member which is impervious to the electrolyte, to avoid allowing the electrolyte to reach the negative electrode or terminal plate of the next adjacent cell.

A somewhat different problem exists with respect to a type of flat dry cell and dry cell battery made from such flat dry cells which is disclosed in a copending application of Clifford G. Nelson Serial No. 245,166, filed September 5, 1951, of which the present application is an improvement. In the aforesaid application Serial No. 245,166, contact between individual cells is provided by elements or jumpers of conductive material such as metal, each of which may be integral with the electrodes it joins, which electrodes are sealed in pliable insulating material to prevent passage of electrolyte along any surface of said conductive material. In this type of cell the electrolyte is prevented from passing from one cell to the next by carefully sealing the pliable insulating material around the protruding conductive element or jumper. In this type of flat dry cell the positive electrode, or the positive terminal member, does not need to fulfill the function of preventing electrolyte from reaching the next adjacent cell as in the other types mentioned above.

One of the features described in the copending application 245,166, is that of providing a base plate or sheet, preferably of metal, and on which is superimposed a synthetic resinous or plastic, conductive coating. The base sheet or plate serves as a conductor from which the jumper strip, which may be integral therewith or may be conductively connected thereto, serves to conduct electrical energy from one cell to an adjacent cell. Very few metals are resistant to the electrolyte used in dry cells and it has been found most practical to use zinc or steel as the metal sheet or plate for supporting the synthetic resinous or plastic conductive coating. Even these metals are readily and rapidly attacked by the ammonium chloride-zinc chloride electrolyte of a Le Clanche cell and otherwise suitable metals may be attacked by an alkaline electrolyte. The conductive coating placed upon the metal sheet or plate should be of such a nature as will prevent the metal plates from being attacked by the electrolyte and particularly to prevent attack on the metal adjacent the conductor strip or jumper leading from the metal plate to an adjacent cell. The prevention of such attack involves some problems.

The principal object of the present invention is, therefore, to provide a new and improved dry cell structure wherein the necessary cell elements are completely enclosed between two faces of flexible non-conductive plastic material which are edge-sealed around the entire periphery of each cell unit. Consequently the metal base plate or collector plate (which forms part of the cell construction of the type of cell described in application Serial No. 245,166) may be completely sealed within a plastic envelope and does not have any connector tab or jumper strip protruding between any marginal edges of the two plastic sheets.

Still another object of this invention is to provide a metal collector plate with one or more sharpened edges or extremities or portions which are adapted to puncture the adjacent insulating envelope and the corresponding insulating envelope of an adjacent cell unit to provide cell-to-cell contact while preventing the escape of electrolyte from within the envelope which seals each cell unit. It is an object of this invention to provide such cell-to-cell contact by means of punctures of the non-conductive envelope in a manner which seals the edges of the puncturing surface.

Still another object is to provide individual dry cells of the flat, or wafer, type which may be individually fabricated and stored as such with long shelf life and which may be individually tested in a convenient economical and rapid manner prior to their assembly into a dry cell battery.

Still another object is the provision of individual dry cells of the flat, or wafer, type which may be conveniently stacked either in series contacts, parallel contacts or series-parallel contacts to form A or B batteries or more complex battery packs of any desired voltage and without requiring expensive and cumbersome exterior wrappings or containers.

Still further objects and the entire scope of applicability of the present application will become apparent from the broad and detailed descriptions and specific examples given hereinafter. It should be understood, however, that the detailed description and specific examples are given by way of illustration only; and, while indicating preferred embodiments of the invention, are not given by way of limitation, since various changes and modifications in the spirit and scope of the invention will become apparent to those skilled in the art from this detailed description.

Broadly, the above objects are accomplished by providing one or a pair of non-conductive, and preferably flexible, plastic sheets or strips, the interior surface or faces of which are preferably coated with a suitable adhesive over all, or a portion, of such interior surface. In one embodiment a single such sheet of non-conductive plastic may be large enough to be folded at one edge and edge-sealed on the other edges; in another embodiment a matching pair of sheets of non-conducting plastic may be brought face to face and edge-sealed around all edges, in each such embodiment the sheet or sheets of non-conducting plastic are edge-sealed to envelop the required elements for a single cell. In a further embodiment two or more cell units may be fabricated by placing the required elements between a pair of relatively elongated strips of non-conductive plastic which may be edge-sealed along the lateral edges and at the two end edges of the strips and sealed transversely in between each cell unit.

In all modifications the cell elements will be positioned between the interior faces of the pair of non-conductive sheets or strips, or between the interior surfaces of the folded single sheet, of plastic before the plastic is sealed to make a completely enclosed envelope around the cell elements. The cell elements will comprise an electrode, preferably a metal sheet, preferably disposed against one interior face of non-conductive plastic and separated from a sheet or cake of depolarizer mix by a suitable electrolyte carrier which may be a sheet of bibulous or starch paper. The mix cake is preferably positioned, on its opposite face, against a sheet of conductive plastic which serves as the other electrode of the cell. This sheet of conductive plastic is in turn completely edge-sealed against the opposite interior face of non-conductive plastic in such a manner as to enclose a suitable metallic-collector plate or sheet, preferably of steel or suitable ferrous alloy.

In all embodiments the metallic collector plate or sheet may be visualized as completely enclosed between an interior blister, the outer wall of which is non-conductive plastic and the inner wall of which is conductive plastic. In one embodiment the metallic collector plate or sheet may be provided with one or more outwardly directed points or protuberances adapted to puncture the non-conductive plastic wall for the purpose of making electrical contact with an adjacent cell or a suitable battery contact or terminal. In another embodiment the metallic contact or sheet may be a plane surface adapted to provide a cell contact element when the non-conductive plastic wall is punctured from the outside by inwardly directed points or protuberances on a suitable battery contact or terminal.

In all embodiments the metallic collector plate or sheet will be completely sealed within the interior blister and all cell elements, including both electrodes, mix cake and electrolyte carrier will be completely encased, as a unitary dry cell, within a completely sealed non-conductive envelope of plastic.

For a more complete understanding of the nature and scope of the present invention, reference may be made to the following detailed description taken in connection with the accompanying drawings in which.

Figures 1, 2, 3, 4:
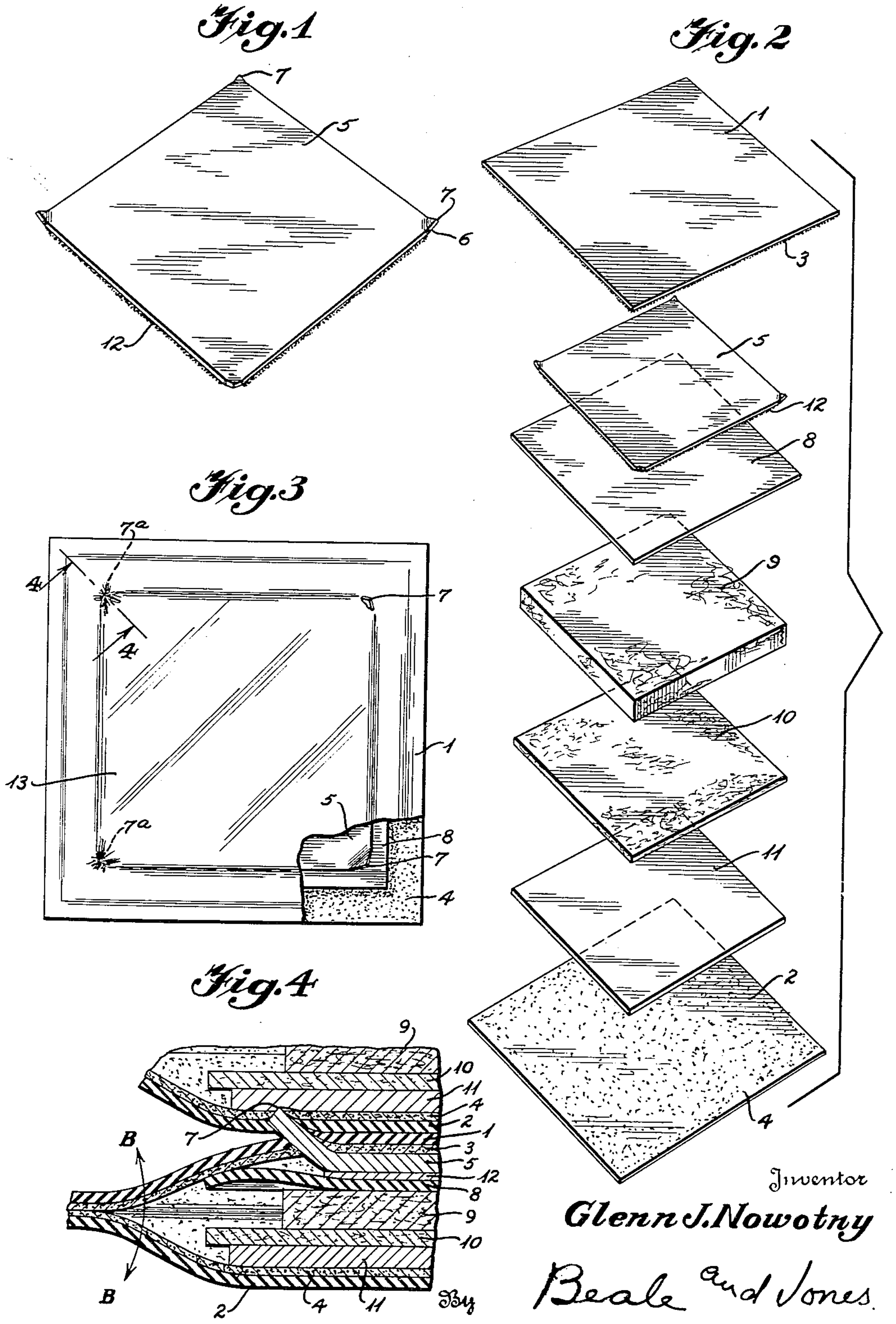
Figure 1 is a perspective view of a preferred, but illustrative, form of metal collector plates.
Figure 2 is an expanded view, in perspective, of the unassembled elements of the cell.
Figure 3 is a top plan view, partly broken away to disclose the interior of an assembled completed cell unit.
Figure 4 is a fragmentary view, in cross section, of a side elevation, in some detail, showing the manner of making contact between two adjacent cells and likewise showing the position of the cell elements in an assembled cell.

Referring to the drawings, wherein like reference numerals refer to similar elements, the cell elements utilized in assembling an illustrative form of cell embodying the principles of this invention are shown in Figure 2 of the drawings. The external components of the envelope, which is a non-conductive plastic such as "Pliofilm," are represented as sheets 1 and 2. The inner, facing, surfaces of the sheets 1 and 2 are at least partially coated with a suitable adhesive, 3 and 4. A metal collector plate 5, which by way of illustration is shown having its four corners 6 upturned and pointed 7, is adapted to be placed on the adhesive surface 3 of "Pliofilm" sheet 1, with the corners 7 pointed toward and adapted to be embedded into the adhesive 3. Beneath the conductive plate 5 is a sheet of conductive plastic, which preferably is slightly larger in all dimensions than the dimensions of the collector plate 5, and which is adapted to be edge-sealed to "Pliofilm" sheet 1 around the marginal edges of collector plate 5. A suitable depolarizer mix cake 9 may then be placed beneath and adjacent the film of conductive plastic 8 and a suitable sheet of material 10, adapted to carry an appropriate amount of electrolyte, is disposed beneath the block of mix cake. The electrolyte carrier may be bibulous paper, starched paper, "Webril," or any suitable medium for absorbing and retaining the electrolyte solution. An electrode 11, which may be zinc, magnesium, aluminum, iron or the like, is disposed beneath the electrolyte carrier 10 and is preferably affixed against and adhesively secured to the inner surface 4 of "Pliofilm" sheet 2. It will be observed that all of the elements illustrated in Figure 2 of the drawings are substantially rectangular in outline and that the dimensions of the two extremities, i. e., the sheets 1 and 2, are somewhat greater than the dimensions of the intermediate elements described above. When the intermediate elements have been positioned as described above, the edges of the "Pliofilm" sheets 1 and 2 are bonded together by compressing the adhesive around the entire margins of the two "Pliofilm" sheets as illustrated in Figure 3 and as further illustrated in Figure 4 of the drawings.

When assembled and edge-sealed as described above, each cell will appear as shown in Figure 3 of the drawings and the sealed edges around the entire periphery of each cell will appear as shown in Figure 4 of the drawings. While the cell elements, discussed above and illustrated in Figures 2, 3 and 4 of the drawings, are substantially rectangular in outline, in fact square, it will be readily understood that other geometric patterns may be employed. Thus the cell and its components may be circular, oval, triangular, polyangular, oblong or unsymmetrical in outline if desired.

When it is desired to assemble two or more cells to form a battery of any desired voltage the unit cells may be placed one on top of another in the form of a stack and the stack subjected to compression. Under such compression the sharp points 7 on the metal plates 5 pierce through and puncture the sheet 1 of "Pliofilm" not only of the cell enclosing the metal plate 5 but also the sheet 2 of "Pliofilm" of the cell just above as shown in Figure 4. The metal points contact the zinc electrode in the super-imposed cell and provide for the necessary cell-to-cell conductivity. As will be observed from Figure 4 of the drawings, the metal points penetrate through the adhesive coatings in penetrating through the two sheets of "Pliofilm" and while the "Pliofilm" sheets 1 and 2 are punctured the punctures are self-sealed by the adhesive of layers 3 and 4, thus effectively preventing the escape of electrolyte from within either cell.

Figure 5:
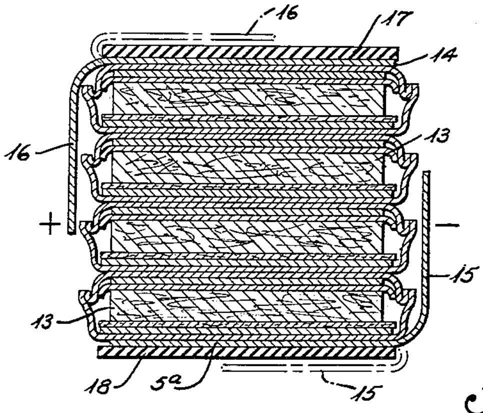
Figure 5 is a side elevation, in cross section, showing a battery formed from a stack of superimposed cell units and wherein the cells are arranged in series connection.
Figure 6:
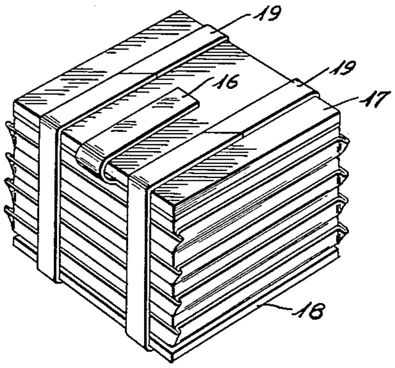
Figure 6 is a perspective view of a battery formed of the cell units as shown in Figure 5.
Figure 10:
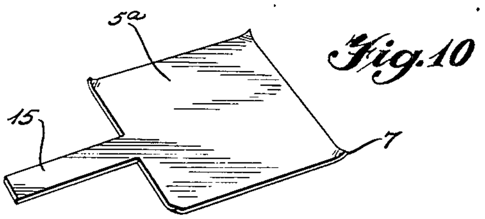
Figure 10 is a perspective view of an element adapted for use as one of the end terminals of a battery such as that illustrated in Figures 6 or 9 of the drawings.
Figure 11:
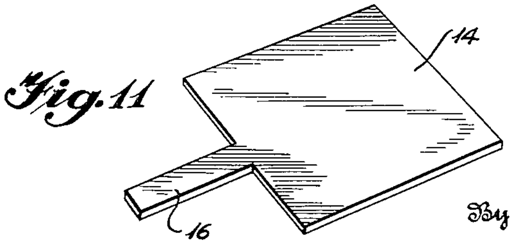
Figure 11 is a perspective of another terminal element adapted for use in the battery as illustrated in Figures 6 and 9 of the drawings.

It will thus be apparent that a plurality of cells may be stacked together and assembled in a battery wherein each cell is in electrically conductive relationship with regard to the adjacent cells but wherein each cell is a completely sealed and completely enveloped unit. In Figures 5 and 6 of the drawings a battery so formed has been illustrated with four unit cells designated as 13 for reference. In the battery illustrated in Figures 5 and 6 of the drawings a negative battery terminal 5*a*, see Figure 10 of the drawings, generally similar to the metallic collector plates 5 but having a contact tab 15 is positioned below the bottommost cell with the points 7 directed toward the bottom sheet of "Pliofilm" on that cell. After the terminal plate 5*a* has been positioned it may be covered with a suitable insulating sheet 18 and the tab or terminal member 15 bent downwardly over the end of the battery. At the positive end of the battery a metallic terminal plate similar to 5*a* but designated 14 likewise having a terminal tab 16 is placed on top of the upper sheet of "Pliofilm" on the uppermost cell with points down, and a sheet of insulating material 17 is then placed over the terminal plate 14. The stack of cells may then be subjected to suitable compression and strapped, as by straps 19, or otherwise suitably bound, into a moderately compressed stack of cells.

It will be understood that the elements of the battery shown in Figures 5 and 6 have been given by way of illustration. Various modifications are within the scope of this invention. Thus end sheets 17 and 18 may be conductive rather than non-conductive and may if desired be omitted entirely. The tabs 15 and 16 on the end terminal plates may be omitted or replaced by any suitable form of terminal which may be stamped on or soldered or welded onto the end terminal plate.

Figure 7:
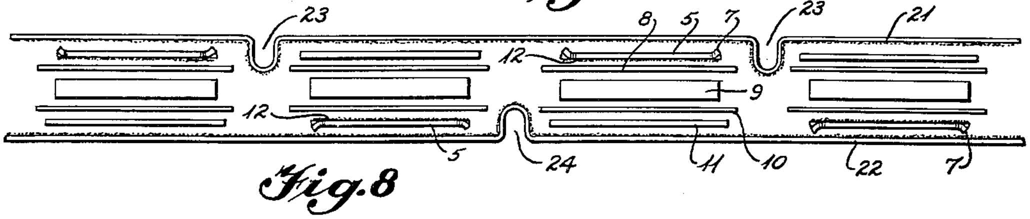
Figure 7 is a side elevational, somewhat diagrammatic, view showing a modification of cell structure to permit the assembly of a plurality of cells within individual envelopes but wherein the enveloping plastic sheets are large strips; it will be understood that the elements shown in Figure 7 are spaced apart for clarity of presentation.
Figure 8:
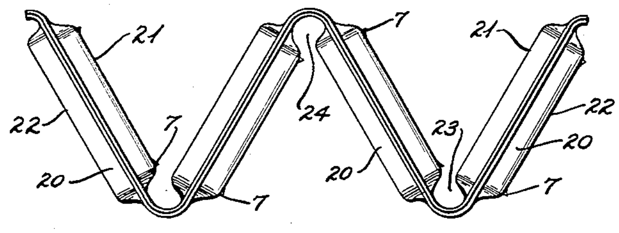
Figure 8 is a side elevational view of a plurality of cells formed as illustrated in Figure 7 of the drawings, with the cells being partially folded over as they would appear at an intermediate stage in arranging a stack of superimposed cells.
Figure 9:
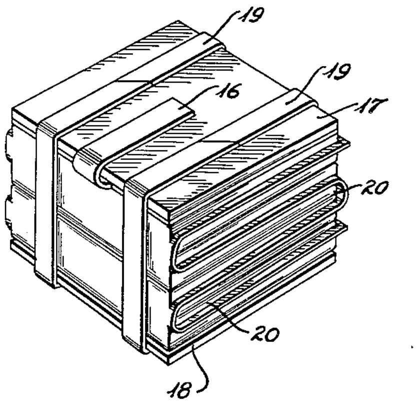
Figure 9 is a perspective view of a battery formed of the cell units which have been prepared in accordance with Figures 7 and 8 of the drawings and wherein the cells are arranged in series connection.

In the several forms of cell described above the cells have been individually formed by the edge-sealing of a pair of generally square sheets of "Pliofilm." Under some circumstances it may be desired to form a plurality of cells by assembling the cell components between relatively elongated strips of "Pliofilm." An illustrative manner of assembling two or more cells between such elongated strips of "Pliofilm" is shown in Figures 7, 8 and 9 of the drawings. With reference to Figure 7 a rather long strip of "Pliofilm" 21 having its inner surface covered at least partially with an adhesive is placed opposite a similar long strip of "Pliofilm" 22 likewise having its inner surface covered at least partially with a suitable adhesive. The metal collector plates 5, sheets of conductive plastic 8, electrolyte carriers 10 and zinc electrodes 11 may be arranged in the manner described above with relation to Figure 2 of the drawings. However, these elements are reversed from top to bottom with respect to every other cell as fully shown in Figure 7 of the drawings. Between each pair of cells a certain amount of surplus "Pliofilm" material sufficient to provide a recessed bend 23, or 24, and to provide sufficient material for edge-sealing between each two cells is supplied. When the cell components have been arranged to provide for the desired number of cells between the "Pliofilm" strips 21 and 22 the cells are each placed under compression and the envelopes are completely sealed around the entire periphery of each cell unit. Sufficient excess material is provided between each cell unit to provide for not only the transverse edge-sealing but folding of the sealed edges between each two adjacent cells. The strip of cells so sealed may then be folded accordion-wise as shown successively in Figures 8 and 9, to form a stack of cells. The stack of cells may then be provided with suitable terminal plates and binding means as shown for example in Figure 9 of the drawings.

Figure 12:
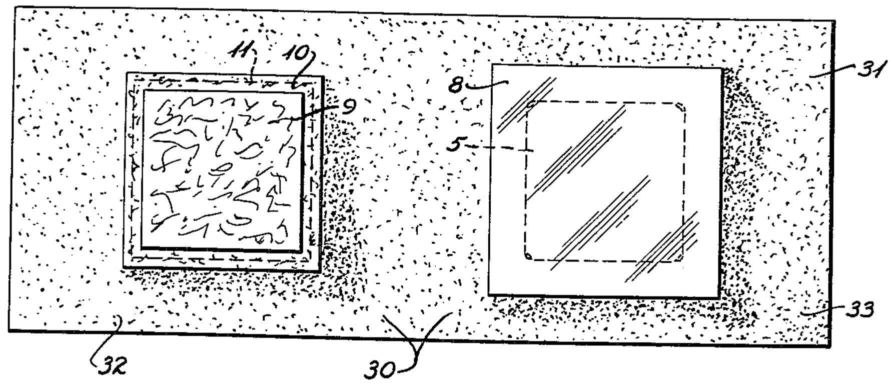
Figure 12 is a top plan view of another modification of dry cell wherein a single sheet of non-conductive plastic is employed in lieu of the two sheets shown in Figures 2 and 5 or two strips shown in Figures 7 and 8, and wherein the cell is shown prior to final assembly.
Figure 13:
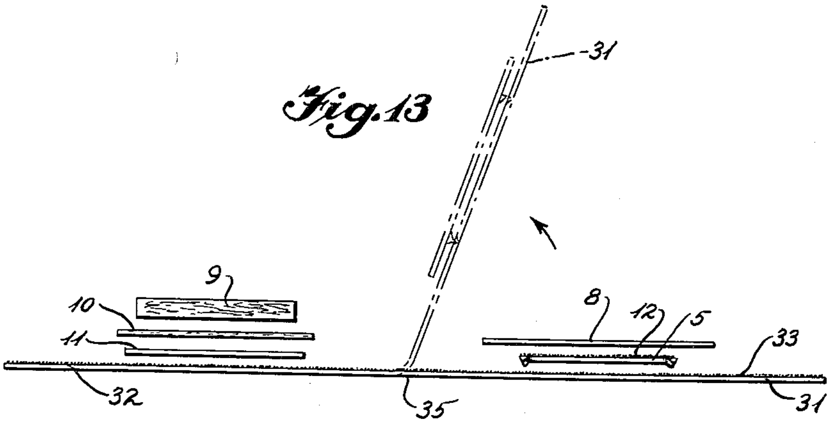
Figure 13 is a side elevation, partly diagrammatic, of the cell of Figure 12, and showing in dotted lines the direction of fold in assembling the cell.
Figure 14:
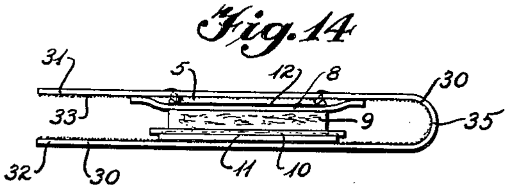
Figure 14 is a side elevation, partly diagrammatic showing the position of the cell elements of Figures 12 and 13 after the folding has been completed but before the non-conductive plastic envelope has been edge-sealed

A further modification of cell is illustrated in Figures 12, 13 and 14 of the drawings. In fabricating a single cell unit it may be desirable to utilize a single sheet of enveloping non-conductive plastic rather than the pair of sheets 1 and 2 shown in Figure 2 of the drawings. In Figure 12 a single sheet of non-conductive plastic 30 is shown with one face at least partially covered with adhesive 33. Sheet 30 is here shown as oblong and of sufficient length to permit its being folded and edge-sealed to form a cell envelope. On one half 31 of sheet 30 a suitable collector plate 5 is positioned points down and a sheet of conductive plastic 8 is superposed over and edge-sealed around collector plate 5. On the other half 32 of sheet 30 a suitable electrode sheet 11 is positioned against sheet 30 and covered with electrolyte carrier 10 and mix cake 9. Sheet half 31 is then folded around median line 35 until substantially parallel with sheet half 32 and with cell elements 5, 8, 9, 10 and 11 in registery with each other as shown in Figure 14. Thereafter the edge along median line may, if desired, be pinched down and edge-sealed; the remaining envelope edges are edge-sealed. In Figure 13 the cell elements 5, 8, 9, 10 and 11 have been shown spaced apart for clarity in portraying both the cell construction and an illustrative method of assembling and positioning the cell elements. In Figure 14 the cell elements are shown in position with the envelope, provided by the single sheet 30, not finally formed. It will be understood that other shapes of sheet 30 and other arrangements of the cell elements may be utilized.

Figure 15:
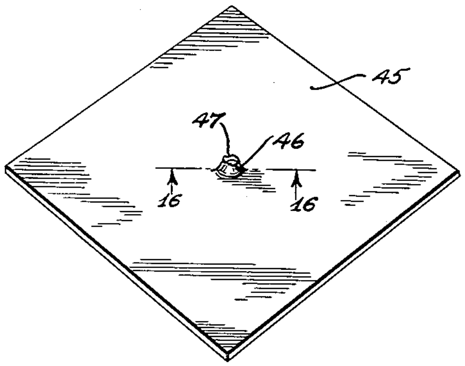
Figure 15 is a perspective view of a modification of metal collector plate differing from that of Figure 1.
Figure 16:
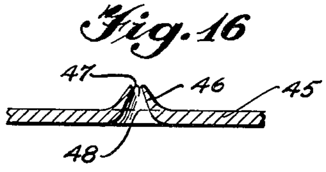
Figure 16 is a fragmentary side elevation, in cross-section, taken along the line 16—16 of Figure 15.

In Figures 1 and 2 there has been shown an illustrative form of metal collector plate 5. Other forms may be utilized and Figures 15 to 20 show other modifications. In Figures 15 and 16 collector plate 45 has an up-struck cone 46, terminating in a puncturing annulus 47. This form of collector plate may be fabricated by driving a pointed object, e. g. a nail, through the plate.

Figure 17:
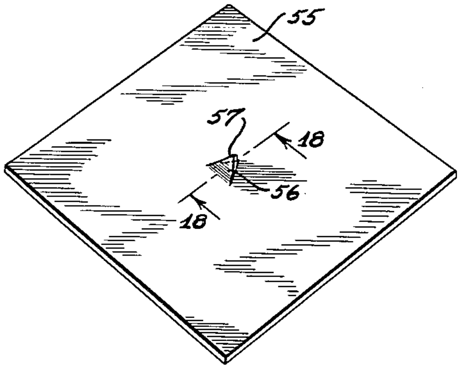
Figure 17 is a perspective view of a modification of metal collector plate differing from that of Figures 1 or 15.
Figure 18:
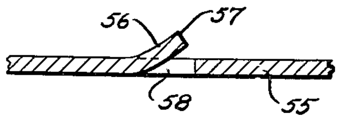
Figure 18 is a fragmentary side elevation in cross-section, taken along the line 18—18 of Figure 17.
Figure 19:
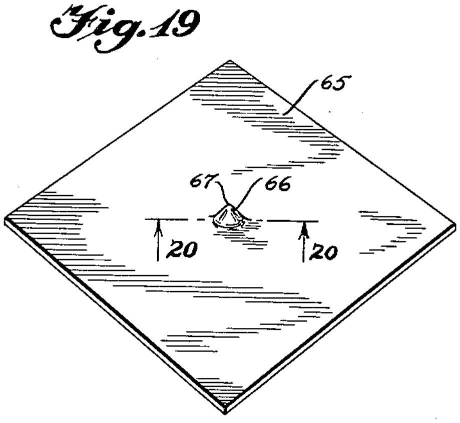
Figure 19 is a perspective view of a modification of metal collector plate differing from that of Figures 1, 15 or 17.
Figure 20:
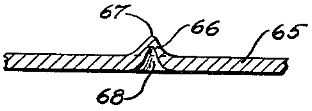
Figure 20 is a fragmentary side elevation in cross-section, taken along the line 20—20 of Figure 19.

In Figures 17 and 18 collector plate 55 has an up-struck "V" 56, terminating in a puncturing point 57. In Figures 19 and 20 collector plate 65 has an elevated contact surface 66 terminating in a relatively sharp point 67. This form of contact surface may be formed by striking plate 67 with a pointed object with sufficient force to deform but not puncture plate 67.

Each of the various forms of collector plates illustrated in Figures 1, 2, 15, 16, 17, 18, 19 and 20 may, of course have one or a plurality of contact points or various combinations of different forms of contact points. The collector plates need not be square, as illustrated in these severcal figures of the drawings, but may be of any size or shape deemed best suited for the requirements of a particular cell.

Figure 21:
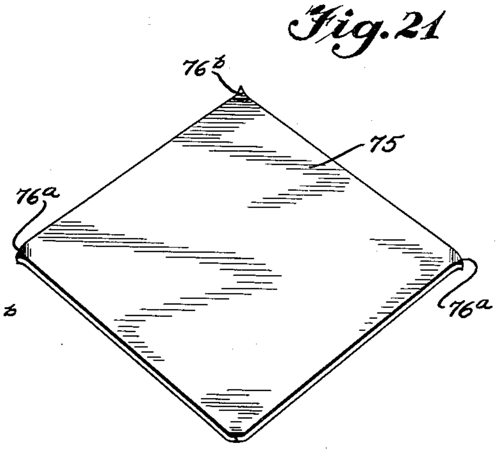
Figure 21 is a perspective view of a modification of battery contact or terminal adapted for use with one embodiment of dry cell.
Figure 22:
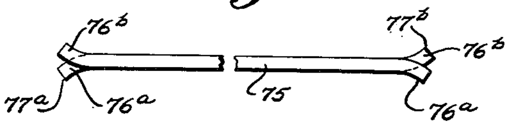
Figure 22 is an end view of the battery contact or terminal shown in Figure 21.
Figure 23:
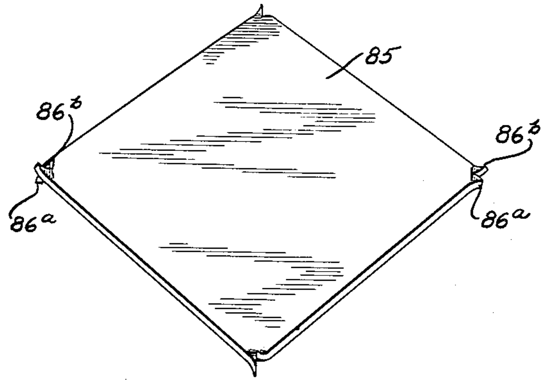
Figure 23 is a perspective view of another modification of battery contact or terminal differing from that of Figures 10 or 21.

In Figures 21 and 22 there is illustrated a further modification of collector plate adapted to make desired contact in two directions, e. g. above and below the plate. This is accomplished by modifying the structure of plate 5 to provide sharp corners which alternatively point up or down. Thus plate 75 has two of its corners 76a bent downwardly and the other two corners 76b bent upwardly to provide puncturing points 77a and 77b, respectively. Figure 23 shows a further modification of such a two-way contact plate. This may be conveniently formed by making diagonal slits at the four corners of plate 85 and bending upwardly one corner segment 86b and downwardly the other corner segment 86a adjacent each slit.

Figure 24:
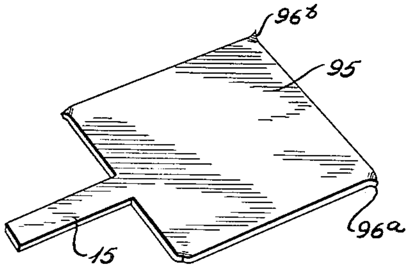
Figure 24 is a perspective view of another modification of battery contact or terminal differing from that of Figures 10, 21 or 23.

Figure 24 shows an illustrative form of terminal plate provided with two-way contact points. In this form plate 95 has some upwardly turned corners 96b and some downwardly turned corners 96a similar to the collector plate 75 and provided with a suitable extension or tab 15 similar to terminal plate 5a. It will be understood that two or more properly directed contact points of any suitable type, such as those shown in Figures 15 to 20 of the drawings, may be uesd in conjunction with, or in lieu of, the upwardly or downwardly turned corners of plate 95. It will also be understood that tab 15 may be integral with, or soldered or welded to plate 95; it may be replaced by wire or omitted if desired.

Figure 25:
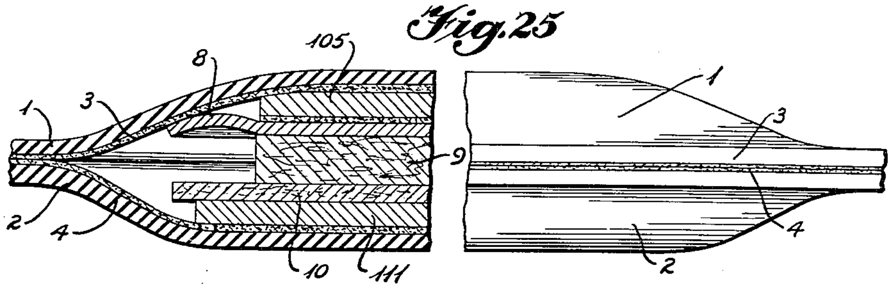
Figure 25 is a side elevation, partly in cross-section of another modification of dry cell differing from that of Figures 2, 3 and 4.

In Figure 25 there is shown another embodiment of dry cell which may be generally similar to the embodiment illustrated in Figures 2, 3 and 4 but contains several departures from that embodiment. In this embodiment collector plate 105 is preferably a plane sheet of metal characterized by having no puncturing points such as appear on collector plates 5, 45, 55, 65, 75 or 85. Plate 105 is sealed between non-conductive sheet 1 and conductive sheet 8 and is within the sealed envelope formed by non-conductive sheets 1 and 2 as are the mix cake 9, electrolyte carrier 10 and electrode 111. Electrode 111 should preferably be relatively rigid, preferably a metallic sheet of suitable gauge as distinguished from metal foil or an electrode made from compressed grains or particles of electrode material.

The cell illustrated in Figure 25 is preferably employed in conjunction with other cells of similar construction by establishing cell-to-cell electrical contact through the employment of two-way contact plates such as those illustrated in Figures 21, 22, and 23 of the drawings. When a contact plate such as 75 is placed between a pair of cells of the type shown in Figure 25 arranged for series contact points 76b will penetrate through sheet 2 of the upper cell and make contact with the electrode 111 adjacent thereto while points 76a will penetrate through sheet 1 of the lower cell and make contact with collector plate 105 thereof. As distinguished from the unit cell of Figures 2, 3 and 4 of the drawings wherein the points 7 of collector plate 5 are initially enclosed entirely within the non-conductive plastic envelope and puncture outwardly through the adjacent plastic sheet 1, but inwardly through the plastic sheet 2 of a superposed unit cell, in the instant embodiment the points 76a and 76b puncture inwardly, i. e. toward the interior of each of the adjacent cells.

It will be understood of course that a unit cell of the form illustrated in Figure 25 may be employed in conjunction with a cell of the form illustrated in Figure 4 by establishing cell-to-cell electrical contact between points 7 of collector plate 5 of one cell with electrode 111 of the other cell. It will also be understood that other combinations of the several forms of cells and types of contact plates may be used as desired.

Figures 26, 27:
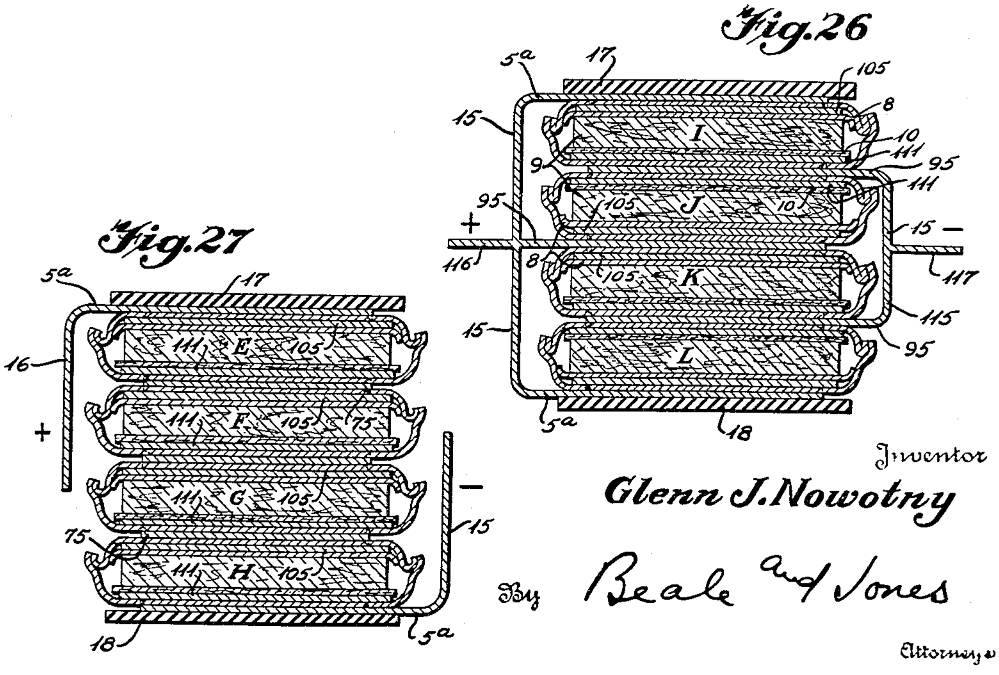
Figure 26 is a side elevation, in cross-section, of a battery formed of the cell units shown in Figure 25 and wherein the cells are arranged in parallel contact.
Figure 27 is a side elevation, in cross-section, of a battery formed of the cell units shown in Figure 25 and wherein the cells are arranged in series contact.

The cells illustrated in Figure 25 may be employed to form "A" batteries by stacking a plurality of cells arranged in desired order of polarity as shown in Figure 26. In this figure four cells I, J, K and L have been stacked in such a manner that electrodes 111 of cells I and J are juxtaposed, electrodes 111 of cells K and L are juxtaposed and collector plates 105 of cells J and K are juxtaposed. A two-way contact member 95 is placed between cells I and J, a similar member 95 is placed between cells K and L and the tabs 15 of these two members 95 are joined or connected with a suitable negative battery terminal 117. Terminal plates such as 5a are placed against the outer envelope of each end cell I and L and a two-way contact plate 95 is placed between cells J and K. The tabs 15 of the end terminal plates 5a are joined or connected with tab 15 of contact plate 95 and in turn joined or connected with a suitable positive battery terminal 116. It will be understood that any suitable numbers and arrangements of cells may be employed depending on the desired battery characteristics and performance; the four cells shown in Figure 26 are only by way of illustration and would provide a 1.5 volt "A" battery.

Instead of parallel contact, the unit cells may be disposed in series as shown in Figure 27. In this figure four cells E, F, G and H are so stacked as to place the collector plates 105 of cells F, G and H adjacent the electrodes 111 of cells E, F and G, respectively, and two-way contact plates 75 are disposed between E and F, F and G and G and H, respectively. Terminal plates 5a may be placed at each end of the stack and tabs 15 and 16 may be used as or connected to suitable negative and positive battery terminals. It will again be understood that any suitable numbers and arrangements of cells may be employed depending on the desired battery characteristics and performance; the four cells shown in Figure 27 are only by way of illustration and would provide a 6.0 volt "B" battery.

In both Figures 26 and 27 the batteries have been illustrated somewhat diagrammatically, although in cross-section, to portray the arrangement of cells and contacts without attempting to show the binding means or battery terminals described with relation to Figures 6 and 9.

The individual cells and the batteries described above by way of illustration have certain characteristics common to all forms thereof. Each unit cell is completely sealed around its entire marginal periphery. When the cell elements have been placed in position and the insulating envelope sealed around the cell elements the cell has no protruding terminal members between the edges of the envelope or positioned at any other part of the envelope. In the form of cell illustrated in Figures 2, 3, 4, 8, 12, 13 and 14 the envelope formed by sheets 1 and 2, or 21 and 22 or sheet 30 immediately after edge-sealing may or may not contain the collector plates such as 5 without any penetration or puncturing of the non-conductive plastic wall adjacent thereto. In some instances as by accidental dropping or handling or even slight compression in storing one or more points 7 may puncture the plastic wall of the envelope. This has been illustrated in Figure 3 of the drawings by showing enveloped points 7a in dotted lines and protruding points 7 in full lines. Since the cell is constructed to prevent electrolyte leakage from within the cell even though the enveloping wall is deliberately punctured in use, the inadvertent or even deliberate pre-puncturing of the envelope is not deleterious in this embodiment. Even where contact plates such as 45 or 55 are used the apertures 48 or 58 do not permit electrolyte leakage from one cell to an adjacent cell. However, to minimize the possibility of electrolyte attack on the collector plate itself it may be desirable to plug apertures 48 or 58 as by means of excess adhesive.

In the form of cell illustrated in Figure 25 there is of course no puncturing of the non-conductive envelope during fabrication, handling or storage of the cells or in fact until the cells are stacked and subjected to compression in the presence of externally applied contact plates such as 75, 85, **5*a* in assembling a given battery. As a general proposition relative to all embodiments of the present invention it is only after a cell has been subjected to some compression so as to puncture the envelope by means of the puncturing contact points that the cell is capable of making contact with another cell. An advantage of this arrangement is that even though the metal collector plates may be formed of a metal which can be attacked by the electrolyte there is no path for electrolyte creepage from within to a point outside of the enveloped cell. Even when a plurality of cells are stacked and placed under compression so that the points 7** puncture the "Pliofilm" envelope there is no path for the electrolyte to escape because the adhesive lining within the envelope seals the puncture and prevents electrolyte escapage.

It is to be understood that various forms of penetrating points or edges may be used for or in connection with the collector plates 5 or 75 or contact plate **5*a* or 95** but the upturned corners with sharp edges illustrated in Figures 1, 10, 21 and 24 of the drawings are preferred forms. The angularity of the upturn is about 45° from the plane of the metal collector plate. While this angularity is not critical, it is important because it permits the corners to flex somewhat when a stack of cells is placed under compression and the result of such flexing is to give each corner a bite into the metal electrode in the superposed cell. This has a tendency to cause a slight scoring in the metal surface and thus increases electrical conductivity. While the foregoing form of collector plate is the preferred form, it is to be understood that other means of providing upstanding puncturing points may be incorporated in either the collector plates or contact plates, the essential requirement being that the points or edges are long enough and sharp enough to penetrate through adjacent layer or layers of "Pliofilm" and provide contact between the collector plate of one cell and the metal electrode of the adjacent cell while minimizing the area of puncture of the non-conductive "Pliofilm" envelope.

Reference has been made hereabove to coating the interior faces of the enveloping sheet or sheets of "Pliofilm" with a suitable adhesive. There may be considerable variation in the use of such adhesive coating and in the places and proportions of the non-conductive surface to which it may be applied. In some instances adhesive coatings 3 and 4 may be applied, as illustrated in Figures 2, 3 and 4 of the drawings, to the entire inner faces of both sheets 1 and 2. Alternatively adhesive may be applied only to a central area of the inner face of, and omitted from the marginal edges of, one or both of the non-conductive sheets as where it is desired to heat-seal the marginal edges of the envelope. This is illustrated on Figure 4 of the drawings by arc B—B, by reference to which it will be understood that adhesive may be omitted from the portions to the left thereof.

In applying the adhesive, as described just above, the adhesively coated portions of the non-conductive enveloping sheets assist in positioning, and maintaining in position, the collector plate 5 or 105 and the electrodes 11 or 111 respectively, thus facilitating the assembly of the cell elements before finally edge sealing the envelope. However, in some circumstances an adhesive coating may be omitted from most of the central areas of the non-conductive sheets and applied only to the marginal areas of one or both non-conductive sheets. The marginal application of adhesive coating may be extensive enough to provide an area for adhesively edge-sealing all edges of the non-conductive envelope and, additionally, the marginal edges of the conductive sheet 8 to the overlying portions of non-conductive sheet 1. Alternatively the adhesive may be omitted from the central areas of one or both sheets 1 and 2 and from the marginal edges of one or both such sheets and applied merely as an interior band adapted to permit adhesive edge sealing of conductive sheet 8 to the overlying portions of non-conductive sheet 1 while heat sealing the marginal edges of the non-conductive envelope.

Where an adhesive coating 3 or 4 is applied to all, or a selected portion of, the inner surfaces of one or both of sheets 1 and 2 (or the equivalents thereof illustrated in other figures of the drawings) the adhesive generally need not be, and for most embodiments should not be, conductive since this adhesive is utilized as a sealant or adherent positioning surface and not as a conductive element of the cell. For some purposes it is preferred to have an area of such adhesive coating adjacent to the portions of the non-conductive envelope which are intended to be punctured by the penetrating points or edges of the appropriate collector plates or contact plates. This is desirable where the cells are intended to be enveloped in thin-walled plastic envelopes or where the cells in service will be subjected to extremes of temperature or humidity and where it is desired to have the adhesive coating assist in minimizing and closing the punctures in the envelope. However for less exacting service or with envelopes made of non-conductive plastic which has high resistance to tearing and inherent self-sealing qualities the adhesive coating may be omitted from the areas of puncture. In fact it is within the scope of this invention to omit adhesive coating from any portion of the non-conductive envelope and to utilize heat-sealing both in forming the envelope and the blister or pocket which encases the collector plate.

As stated above, where an adhesive coating is applied to the inner surfaces of the non-conductive sheets, the positioning of the collector plates and metallic electrodes is facilitated during assembly. The positioning of the collector plate is additionally facilitated by virtue of its being sealed within the blister or pocket formed by the slightly larger sheet of conductive material 8. This material should be electrolyte-resistant as well as conductive and in general may serve as the positive electrode of the cell. It is desirable to cut down internal resistance within the cell by providing maximum contact between the adjacent faces of the collector plate and the conductive plastic sheet. Interposing a conductive layer between these adjacent faces of the collector plate and the conductive sheet assists in providing maximum contact. This conductive layer 12 may be a coating 12 of conductive, tacky adhesive preferably applied to the collector plate and against which the adjacent face of the conductive sheet 8 will readily adhere. However, conductive coating 12 need not be tacky but may be of a plastic formulation which is capable of being heat sealed to the conductive plastic sheet. The conductive plastic sheet actually need not be heat sealed thereto in many cases, since adequate surface and conductive contact between conductive sheet 8 and conductive layer 12 may be provided by compression without heat or heat sealing. Another advantageous result of conductive layer 12 is in providing a protective layer around a major surface of the collector plate thus further shielding the collector plate against possible attack by electrolyte. This advantageous result is also achieved by edge sealing or completely sealing the metallic electrode 11 against the non-conductive sheet 3 (or equivalent 32) thereby preventing electrolyte leakage around the bottom of the metallic electrode from which point electrolyte might otherwise attack the collector points and the collector plate of a subjacent cell.

While in theory a suitable conductive layer 12 could be applied, with equally effective results, either to one or both faces of conductive sheet 8 or to one or both faces of the metal collector plate as by dipping into, or brushing the object with a coating, it is preferred to apply the coating to the metal collector plate, preferably by brushing so as to limit the conductive coating to the one desired face of the collector plate.

In a preferred embodiment of this invention the cell is of the LeClanche type. The electrolyte carrier 10 which may be of starched paper will, in such a cell, be suitably impregnated or saturated with an ammonium chloride-zinc chloride electrolyte solution. In such a cell the electrode 11 may desirably be a sheet of zinc. It should be understood, however, that the electrode 11 may be any suitable base of a supporting material impregnated with zinc or may, if desired, be zinc foil or compressed zinc powder. The mix cake will preferably be a mixture of manganese dioxide and a suitable form of carbon or graphite. The conductive sheet 8 may be any form of electrolyte-resistant conductive plastic of which a number of forms are well known.

The present cell, however, is not limited to cells of the LeClanche type. With slight modification and adjustment of materials the present forms of cells and battery construction may be used with other primary cell systems. For use with alkaline electrolytes or with cells of the Lalande type it is preferred to replaced "Pliofilm" with an enveloping plastic which would be somewhat more resistant to the alkaline electrolyte. A plastic sheet formed of polyethylene may be used for such a cell. I have referred throughout to the use of "Pliofilm" as the material for the non-conductive plastic enveloping sheets. It is to be understood that by "Pliofilm" I mean sheets formed of chlorinated rubber films which are well known under the name "Pliofilm." This particular type of non-conductive plastic has the advantages of being tough, resilient, tear-resistant and substantially impervious to both moisture and most gases although capable of venting hydrogen by diffusion. It has the advantage of being resistant to the electrolyte used in the LeClanche cell. It is heat sealable by fusion and is readily bonded together by means of suitable adhesives. In lieu of "Pliofilm," however, polyvinyl and polyethylene films may be used as well as other types of plastic sheet materials which have similar desirable characteristics.

The electrically conductive sheet 8 may be formed from a conductive plastic composition as by casting, calendaring, extrusion or other well known methods for forming sheets of films. Conductive sheets may be employed which are formed from vinyl polymers or other synthetic resins which are compatible with vinyl polymers and which are resistant to moderately concentrated acids and alkalies. Compositions containing finely divided carbon, and, as the film forming material, polyvinyl-butyral resin or ethyl cellulose are suitable. It should be understood, of course, that the conductive layer or coating 12 applied to at least one face of collector plate 5 should likewise be conductive. Other film forming materials which may be employed in these compositions are rubber, neoprene and chlorinated rubber provided, however, that when these film forming materials are used in the conductive sheet 8 the conductive layer or coating 12 should contain a compound compatible therewith as the principal base ingredient. Other resinous materials which may be used in forming the conductive sheet 8 are polyacrylates, polyvinyl halides, polyvinylidene halides, polyacrylonitriles, copolymers of vinyl chloride and vinylidene chloride, polychloroprene, and butadiene-styrene or butadiene-acrylonitrile resins. The conductive particles or elements employed in these compositions may be graphite and either acetylene black or channel black or mixtures thereof. In lieu of finely divided carbonaceous materials, finely divided metal particles such as silver, gold, platinum, titanium or stainless steel particles may be used as the electrically conductive elements.

It will be understood from the foregoing descriptions of illustrative embodiments of the dry cells, batteries formed therefrom, and component parts thereof that considerable variation may be made within the scope of this invention. It should be understood that various changes may be made as by substituting illustrative embodiments shown in one or more of the figures for equivalent embodiments or elements disclosed in other figures of the drawings. Thus for instance the non-conductive envelope shown, in Figures 7 and 8, as made of two elongated strips of non-conductive plastic, may be made of a single elongated strip of laterally folded non-conductive plastic in accordance with the teachings of Figures 12 to 14 and 25 in conjunction with Figures 8 and 9. In short the invention should not be limited beyond the scope of the claims.

I claim:

1. In a primary dry cell, a sealed flexible non-conductive plastic envelope, electrolyte within said envelope and a conducting plate having means for puncturing said envelope without providing a path for electrolyte leakage from within said envelope.

2. A primary dry cell comprising a flexible non-conductive plastic envelope formed by sealing the marginal edges of at least one sheet of such plastic, positive and negative electrodes and an electrolyte confined within said envelope, a metal collector plate disposed within said envelope and in electrical contact with one of said electrodes, and conducting means for puncturing said envelope without providing a path for electrolyte leakage from within said envelope, said means establishing electrical contact from said collector plate to the exterior of the plastic envelope.

3. A primary dry cell comprising a flexible non-conductive plastic envelope formed by sealing all opposed marginal edges of a pair of sheets of such plastic, positive and negative electrodes and an electrolyte confined within said envelope, a metal collector plate disposed within said envelope and in electrical contact with one of said electrodes, and conducting means for puncturing said envelope without providing a path for electrolyte leakage from within said envelope, said means establishing electrical contact from said collector plate to the exterior of the plastic envelope.

4. A primary dry cell comprising a pair of complementary flexible plastic non-conductive sheet members all edges of which are sealed one to the other thereby enveloping a pair of electrodes and an electrolyte, a metal collector plate disposed between said non-conductive sheet members, said metal plate having means for puncturing one of said non-conductive sheet members without providing a path for electrolyte-leakage.

5. A primary dry cell in accordance with claim 4 wherein a large part of the opposed inner surfaces of said non-conductive sheet members is coated with adhesive.

6. A primary dry cell in accordance with claim 4 wherein the opposed marginal edges of said non-conductive sheet members are adhesively bonded together.

7. A primary dry cell in accordance with claim 4 wherein said metal plate is provided with at least one sharp edge lying outside of the plane of said metal plate and adapted to puncture an adjacent portion of a non-conductive sheet member.

8. A primary dry cell in accordance with claim 7 wherein the corners of said metal plate are upturned and sharp.

9. A flat primary dry cell comprising a first sheet of flexible, non-conductive plastic, a complementary second sheet of flexible non-conductive plastic, the marginal edges of said two sheets being sealed together to form a fully enclosed envelope, an electrolyte and electrode elements being confined within said envelope, and conducting means for laterally puncturing one of said sheets of plastic without providing an escape outlet for said electrolyte from within said envelope.

10. A flat primary dry cell in accordance with claim 9 wherein at least a portion of the opposed inner surfaces of said first and second sheets of non-conductive plastic are coated with adhesive.

11. A flat primary dry cell in accordance with claim 9 wherein said means for laterally puncturing one of said sheets comprises a metal member having at least one protruding sharp surface lying outside of the plane of said metal member.

12. A flat primary dry cell in accordance with claim 11 wherein said metal plate is disposed with its sharp surface directed toward and against the adhesively coated inner face of one of said non-conductive sheets.

13. A flat primary dry cell in accordance with claim 12 wherein said metal plate is held in position against a sheet of conductive plastic which is marginally sealed against the inner surface of said non-conductive sheet.

14. A flat primary dry cell in accordance with claim 13 wherein said metal plate is confined between said sheet of conductive plastic and the inner surface of said non-conductive sheet and within the space formed by the marginal seal of said conductive sheet and said surface of said non-conductive sheet.

15. A primary dry cell comprising a flexible non-conductive plastic envelope formed by sealing the marginal edges of at least one sheet of such plastic, positive and negative electrodes and an electrolyte within said envelope, one of said electrodes comprising a sheet of conductive plastic the marginal edges of which are sealed to a portion of the inner surface of said plastic envelope, thereby forming an interior fully closed pocket, and a metal collector element disposed within said pocket.

16. A primary dry cell in accordance with claim 15 wherein said metal collector element is a sheet of metal.

17. A primary dry cell battery comprising at least two juxtaposed flat primary dry cells each comprising a first sheet of flexible, non-conductive plastic, a complementary second sheet of flexible, non-conductive plastic, the marginal edges of said two sheets being sealed together to form a fully enclosed envelope, an electrolyte and electrode elements being confined within said envelope, contact means disposed within said envelope and adapted to puncture one of said sheets of plastic without providing an escape outlet for said electrolyte from within said envelope, means for exerting sufficient pressure upon said juxtaposed cells to cause said contact means to puncture the wall of the enclosing envelope and the wall of the juxtaposed cell whereby to establish electrically conductive contact between the juxtaposed cells.

18. A primary dry cell battery comprising at least two juxtaposed flat primary dry cells each comprising a flexible non-conductive plastic envelope formed by sealing the marginal edges of such plastic, an electrolyte and positive and negative electrodes within said envelope, a metal collector plate within said envelope, said collector plate being in electrically conductive contact with one of said electrodes but isolated from said electrolyte, contact means interposed between, but outside, said cells, said contact means being provided with sharp surfaces directed toward each of said cells and adapted to puncture the envelope of each of said cells without providing an escape outlet for the electrolyte from within said cells, means for exerting sufficient pressure upon said juxtaposed cells and said interposed contact means to cause said contact means to puncture both adjacent walls of the juxtaposed cells whereby to establish electrically conductive contact between the juxtaposed cells.

19. A primary dry cell battery comprising a flexible plastic battery envelope formed by edge-folding an edge of a single sheet of such plastic, sealing at least all opposed marginal edges of said sheet of folded plastic and transversely sealing said sheet of folded plastic to form a plurality of enveloped cell compartments, positive and negative electrodes and an electrolyte confined within each said cell compartment, and a metal collector plate disposed within each cell compartment and in electrical contact with one of said electrodes therein, means for puncturing the adjacent walls of each pair of cell compartments and providing electrical contact, between an electrode in one cell compartment and the metal collector plate within an adjacent compartment.

20. A metal contact element, for use with flat dry cells which are characterized by having all reactive cell elements including electrolyte confined within a sealed envelope of flexible non-conductive plastic, comprising a metal sheet provided with at least one sharp surface disposed outside of the plane of said sheet and adapted to puncture the plastic wall of the cell without permitting escape of electrolyte therefrom.

21. A primary dry cell comprising a flexible non-conductive plastic envelope formed by sealing the marginal edges of at least one sheet of such plastic, positive and negative electrodes and an electrolyte within said envelope, said negative electrode comprising a substantially flat piece of sheet metal disposed on one portion of the envelope, said positive electrode comprising a sheet of conductive plastic the marginal edges of which are sealed to a portion of the inner surface of said plastic envelope opposite the portion on which the negative electrode is disposed, thereby forming an interior closed pocket, and a metal collector element disposed within said pocket.

22. A primary dry cell comprising a flexible non-conductive plastic envelope formed by sealing the marginal edges of at least one sheet of such plastic, positive and negative electrodes and an electrolyte within said envelope, said negative electrode comprising a substantially flat piece of sheet metal disposed on one portion of the envelope, said positive electrode comprising a sheet of conductive plastic the marginal edges of which are sealed to a portion of the inner surface of said plastic envelope opposite the portion on which the negative electrode is disposed, thereby forming an interior pocket, and a metal collector element disposed within said pocket, said metal collector element being a plate of sheet metal having an elevated sharp surface portion adapted to puncture the overlying non-conductive plastic envelope.

23. A primary dry cell battery comprising at least two juxtaposed flat dry cells each comprising a flexible, non-conductive plastic envelope formed by sealing the marginal edges of said plastic, an electrolyte and positive and negative electrodes within said envelope, said negative electrode comprising a substantially flat piece of sheet metal disposed on one portion of the envelope, a metal collector plate disposed within said envelope opposite to said negative electrode in electrical contact with the positive electrode but isolated from the negative electrode and from said electrolyte, and contact means interposed between, but outside, said cells, said contact means being provided with sharp surfaces directed toward each of said cells and adapted to puncture the envelope of each of said cells without providing an escape outlet for the electrolyte from within said cells, means for exerting sufficient pressure upon said juxtaposed cells and said interposed contact means to cause said contact means to puncture both adjacent walls of the juxtaposed cells whereby electrically conductive contact between the juxtaposed cells is established.

24. A primary dry cell battery comprising at least two juxtaposed flat dry cells each comprising a flexible, non-conductive plastic envelope formed by sealing the marginal edges of said plastic, an electrolyte and positive and negative electrodes within said envelope, said negative electrode comprising a substantially flat piece of sheet metal disposed on one portion of the envelope, said positive electrode comprising a sheet of conductive plastic the marginal edges of which are sealed to a portion of the inner surface of said plastic envelope opposite the portion on which is disposed the negative electrode, thereby forming an interior closed pocket, and a metal collector element disposed within said pocket, and contact means interposed between, but outside, said cells, said contact means being provided with sharp surfaces directed toward each of said cells and adapted to puncture the envelope of each of said cells without providing an escape outlet for the electrolyte from within said cells, means for exerting sufficient pressure upon said juxtaposed cells and said interposed contact means to cause said contact means to puncture both adjacent walls of the juxtaposed cells whereby electrically conductive contact between the juxtaposed cells is established.

25. A primary dry cell comprising a flexible non-conductive plastic envelope formed by sealing the marginal edges of at least one sheet of such plastic, positive and negative electrodes and an electrolyte within said envelope, one of said electrodes comprising a sheet of conductive plastic the marginal edges of which are sealed to a portion of the inner surface of said plastic envelope, thereby forming an interior fully closed pocket, and a metal collector element disposed within said pocket, said metal collector element being provided with at least one elevated sharp surface adapted to puncture the overlying non-conductive plastic envelope.

References Cited in the file of this patent

UNITED STATES PATENTS

| | | |
|---|---|---|
| 1,492,435 | Doe | Apr. 29, 1924 |
| 1,737,130 | Storey et al. | Nov. 26, 1929 |
| 2,307,764 | Deibel et al. | Jan. 12, 1943 |
| 2,307,769 | Deibel | Jan. 12, 1943 |
| 2,355,197 | Anthony et al. | Aug. 8, 1944 |
| 2,463,089 | Deibel | Mar. 1, 1949 |
| 2,475,152 | Rock | July 15, 1949 |
| 2,635,128 | Arbogast | Apr. 14, 1953 |
| 2,645,676 | Emeriat | July 14, 1953 |

FOREIGN PATENTS

| | | |
|---|---|---|
| 985,992 | France | Mar. 21, 1951 |